Figures 6, 7, 8, 9, 10, 11:
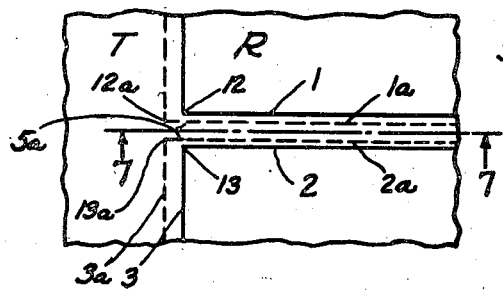

June 21, 1949. P. D. WURZBURGER 2,474,178
PIPE COUPLING
Filed Aug. 9, 1945 3 Sheets-Sheet 1
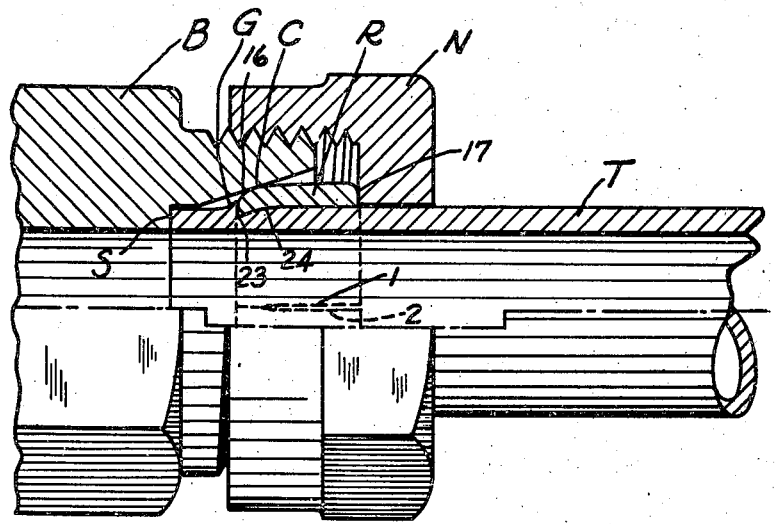
Fig. 1
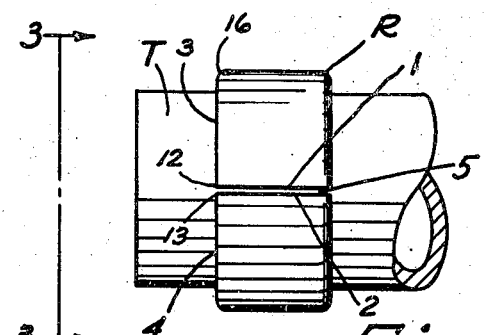
Fig. 2
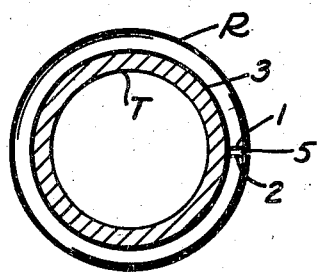
Fig. 3
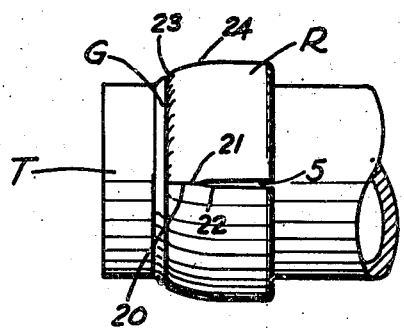
Fig. 5
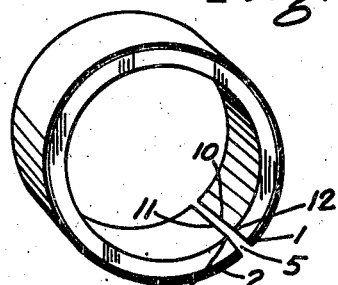
Fig. 4
INVENTOR.
PAUL D. WURZBURGER
BY
ATTORNEYS.

June 21, 1949. P. D. WURZBURGER 2,474,178
PIPE COUPLING
Filed Aug. 9, 1945 3 Sheets-Sheet 2

INVENTOR.
PAUL D. WURZBURGER
BY
ATTORNEYS.

June 21, 1949.    P. D. WURZBURGER    2,474,178
PIPE COUPLING

Filed Aug. 9, 1945    3 Sheets-Sheet 3

INVENTOR.
PAUL D. WURZBURGER
BY
ATTORNEYS.

Patented June 21, 1949

2,474,178

UNITED STATES PATENT OFFICE 2,474,178

PIPE COUPLING

Paul D. Wurzburger, Cleveland Heights, Ohio

Application August 9, 1945, Serial No. 609,739

4 Claims. (Cl. 285—122)

This invention relates to improvements in pipe or tube fittings and couplings and more particularly to the types of couplings having rings or sleeves engaging the tube or pipe to be coupled.

The "Ermeto" type of tube or pipe coupling as shown for example in United States Patents Nos. 1,904,866, 2,139,413 and 2,171,217 and in my copending applications Serial Nos. 556,004, filed September 27, 1944, now Patent No. 2,414,184, and 556,007, filed September 27, 1944, now Patent No. 2,414,995, illustrate some, but not necessarily all, types of couplings and coupling rings or sleeves to the improvement of which my invention is directed. Such coupling rings have heretofore been formed as complete annuli with or without cutting edges at or adjacent their forward ends. As is well known in the use and practice of certain of the Ermeto inventions the ring with its cutting edge is moved forcibly into a conical mouth of a body member whereby to constrict the cutting edge of the ring into cutting engagement with the outside surface of the tube to be coupled whereby to form "a ridge of appreciable size" as more fully described in certain of said patents and applications. As has been taught in the aforementioned patents and applications the characteristic of the sleeve or cutting ring is that it be of material which at least at its cutting edge is harder than the material of the tube into which it cuts to form the aforesaid ridge. This characteristic of the cutting ring has brought with it attendant difficulties in manufacture and operation, has limited the choice of materials and made inspection difficult, especially where the cutting edge has been disposed interiorly of the end of the ring.

Other types of couplings whether known as "Ermeto" or not have utilized complete annular rings or sleeves which did not necessarily cut into the surface of the tube or pipe to be coupled, but which acted upon the principle of materially and substantially constricting the 'forward" edge or portion of the ring whereby to reduce the internal diameter thereof to a substantially smaller diameter than the initial outside diameter of the tube either with accompanying constriction of the wall of the tube as shown for example in the Kreidel Patent No. 1,904,866 mentioned above, or in causing the constricted end of the ring or sleeve to enter a pre-cut or pre-formed annular groove in the outside surface of the wall of the tube or pipe to be coupled. Couplings having rings with these "non-cutting" characteristics as distinguished from those having cutting edges as such are also improved by the instant invention.

To gain the advantages and objects of my invention, which will be more fully discussed below, I provide a ring or sleeve that is not a complete integral annulus, and employ the same in a novel way gaining a novel coaction between the split ends of the ring as well as between the ring and the tube or pipe to be coupled. I am aware that various types of split, so-called sealing or gripping, rings have been known in the coupling art, but such prior art split rings have failed to accomplish the objects of my invention. One common type of prior art split ring has been inherently incapable of performing any fluid sealing function. Such rings have been used to provide a mechanical grip only, and thus made necessary the use of packings or sealing gaskets as additional instrumentalities to provide a fluid seal if that were desired. Similar split rings have also been used in the electrical conduit art where fluid sealing in the sense that I use it in connection with the instant invention was neither sought nor obtained. Split rings have also been used in the fluid conduit art where it has been sought also to obtain a fluid tight joint as well as a mechanically secure joint by the use of a plurality of rings in which the split in one ring or portion thereof has been circumferentially displaced from the split of another ring whereby to seek to cause two imperfect rings to do the job that neither could do alone. The prior art has also taught the use of split rings intended to be sealed at the point where the ring is split but such rings have been so constructed as to fail in point of mechanical grip upon the tube. In summary, the prior art split rings that were designed to grip the tube failed to afford a fluid seal and those that tended to be leak-proof failed to secure the tube mechanically.

It is among the objects of my invention to provide a fluid coupling of the split ring type that will be leak-proof as against high fluid pressures and will so grip the tube or pipe to be coupled as to eliminate the hazard of "blow out" of the tube or pipe from the coupling. Another object is to provide a more efficient, more useful and more economical coupling of the ring or sleeve type. Another object of my invention is to improve the cutting, and/or sealing and gripping action of the ring for Ermeto and other ring or sleeve type couplings. A further object is to provide a coupling sleeve or cutting ring of the split type that is more widely adaptable to variations in dimensional tolerances and of the outside diameter of the tube. A further object is to provide a coupling ring or a cutting ring not of complete annular form but rather of a split ring form which will be self sealing in the sense of sealing the ends of the ring to each other as well as making a seal with the tube and body of the coupling. Another object of my invention is to provide a coupling ring with or without a cutting edge that is capable of aligning or realigning itself to a desired and efficient form in spite of deformations that may be incident to the making or hardening thereof. A further object is to provide a cutting ring in which the cutting edge is of greater density than the other parts of the ring or sleeve. Another object of my invention is to provide a sleeve for the Ermeto and related types of coupling in which a wider choice of materials may be had; in which the cost of manufacture is reduced; in which a wider facility of choice of shape and cross sectional configuration of the ring may be enjoyed and in which inspection is greatly facilitated. Another object is to facilitate the manufacture of satisfactory sealing rings for couplings especially in the larger sizes wherein otherwise expensive machining operation and unusual sizes and shapes of machines would have to be employed. Another object of my invention is to provide a coupling sleeve in which the working thereof may be most advantageous in respect to the work to be done thereby. Another object of my invention is to provide a coupling sleeve that will be resistant to the adverse effects of vibration upon the joint and the coupled tube or pipe.

Figure 12:
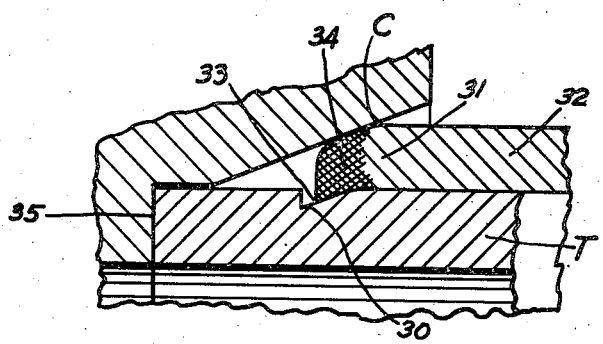
Figure 13:
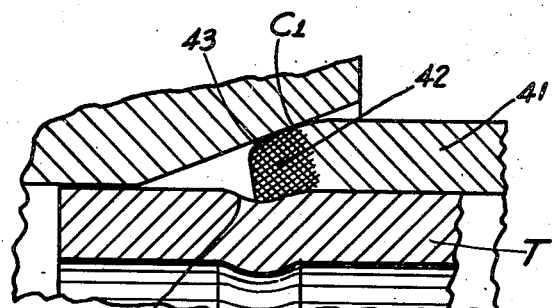
Figure 14:
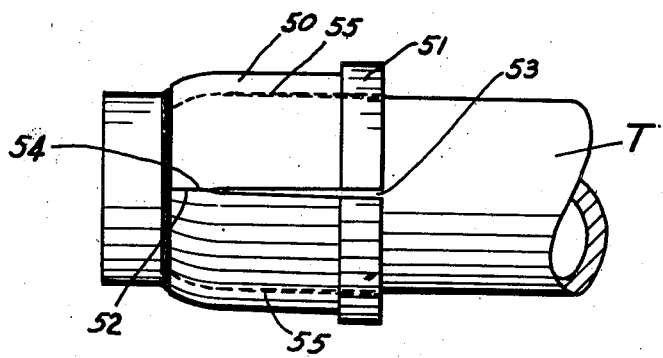

Other objects and advantages of my invention will appear from the following description of a preferred and certain modified forms thereof, reference being had to the accompanying drawings in which Figure 1 is a side elevation partly in longitudinal section of a coupling embodying one form of my invention; Figure 2 is a view of the ring assembled near the end of the tube to be coupled prior to the coupling thereof; Figure 3 is an end elevation of the assembly shown in Figure 2; Figure 4 is an isometric view of one form of split ring embodying my invention; Figure 5 is a view similar to Figure 2 showing the ring in its gripping and sealing relation to the tube as in Figure 1 but with the coupling parts removed for the sake of illustration; Figure 6 is an enlarged view of a portion of the parts shown in Figure 2 adjacent the forward part of the ring near the spaced ends of the ring; Figure 7 is a section taken along the line 7—7 of Figure 6; Figure 8 is a view similar to Figure 6 showing the parts partially advanced toward a sealing position; Figure 9 is a section taken along the line 9—9 of Figure 8; Figure 10 is an enlarged view similar to Figure 6 of the same parts in the condition of the coupling illustrated in Figures 1 and 5; Figure 11 is a section taken along the line 11—11 of Figure 10; Figure 12 is an enlarged fragmentary section showing the forward end of the sealing ring and the adjacent parts of the flared mouth of the coupling and the wall of the tube in a modified form of my invention; Figure 13 is a view similar to Figure 12 of another modified form of my invention and Figure 14 is a view similar to Figure 5 with a modified form of sealing ring.

In Figure 1 I have shown a preferred form of my invention in the environment of an Ermeto coupling of the cutting ring type in which the tube T enters the body member B of the coupling and rests against an internal shoulder S. A nut N having threaded engagement with the body engages the rearward end of the cutting ring or sleeve R forcing it into the conical or flared mouth C of the body whereby to constrict the forward end of the cutting ring into its cutting engagement with the outside wall of the tube and turning up the ridge G of appreciable size whereby to grip the tube and form a fluid tight joint. The ring R of the instant invention however differs from the prior types of cutting rings heretofore known in the art or disclosed in said patents and applications in that it comprises not a complete annulus but rather a split ring, the ends 1 and 2 of which need not necessarily have tight or even intimate contact when the ring is first placed upon the tube prior to its constriction when the joint is formed. In Figures 2, 3 and 4 I have shown the ends 1 and 2 of the ring R widely spaced and it may be taken that the drawing is more or less exaggerated whereby to more fully illustrate the principles of my invention. As shown in these figures, I prefer that the ring be of substantially rectangular cross section with its forward or leading end 3 forming a sharp cutting edge 4 at its juncture with the inner surface of the ring, which, when the ring is advanced leftwardly, as viewed in the drawings and is constricted to cutting engagement with the tube T, will have an effective cutting angle. The included angle of the cutting edge is preferably from about 85° to 89°. In making the ring R for the practice of my invention I prefer to start with strip stock of substantially the ultimate cross section of the ring and then grind or machine or otherwise form the surfaces which delineate the edge and form the other exposed surfaces as may be most convenient while the ring is in the straight form within the strip, at which time I can be certain that the cutting edge has the desired angle and sharpness sought for the finished product. Thereafter after desired lengths of strip corresponding to the peripheral length of the finished split ring are sheared or cut from the strip, preferably cutting the strip at right angles so that the ends 1 and 2 of the ring will be square as shown. I prefer that the ends 1 and 2 be sheared smoothly, having substantially planar surfaces with sharp inner edges 10 and 11, see Fig. 4, but have observed that the operation of my invention tends to offset departures from my stated preference in this respect. Thereafter the severed length of strip is given its ring form by appropriate rolling or bending operations, with appropriate known mechanism, to the form shown in Figure 4 intending preferably that the ends 1 and 2 be brought as close to each other as is readily practicable in the forming operation. Ordinarily the ends of the ring will tend to "spring back" from the contact, if any, incident to forming from about .005" to .015" (as in rings from about ½" to 1" I. D.), leaving a gap 5 between the ends which I find useful in the practice of my invention. Thereafter if the material of the ring adjacent the cutting edge (in rings having a cutting edge) is not harder than the material of the tube with which it is intended to be used, the ring may be surface hardened, and if during the hardening operation there be some warpage whereby the ends 1 and 2 of the ring are displaced somewhat transversely or otherwise, such warpage does not interfere materially with the efficiency and operation thereof. It will be noted that in the rolling or bending of the ring the interior surface of the strip from which the ring is made will tend to be crowded and condensed increasing the density of material at the interior surface and at the cutting edge and also effecting some work hardening of the cutting edge. Similarly rings embodying my invention but not employing cutting edges may with advantage be more dense interiorly than exteriorly. A cutting ring of substantially the same material as the material of the tube, by virtue of being work hardened and having its inner portions condensed by the bending operation may well be harder than the tube in useful degree without other hardening. Conversely, less other hardening need be added to my "worked" rings than is required for equal hardness in rings lacking the initial increment of work hardening. Having regard for the differences in function and operation that distinguish this invention from the prior "Ermeto" patents and applications, the selection of material for the rings of the cutting type may be governed by much the same considerations as taught in said patents and applications; that is to say surface hardened, and/or sufficiently work hardened, low carbon steel rings of proper thickness will cut the surface of steel, copper, aluminum and other tubes that are softer than the rings, and if the rings are properly rounded or "lipped" outwardly and forwardly of the cutting edge they will deflect inwardly in reaction to the flared conical mouth of a steel body without deleteriously cutting or gouging the camming surface of the mouth. Rings following my invention that do not contain cutting edges may be made of similar materials having regard for the different particular coaction between the ring, tube and body where cutting the tube does not take place. It is practicable for example to use a brass ring and brass body with a steel tube where a precut groove is first formed in the tube as in Fig. 12, and a brass ring may well indent a hard copper tube as in Fig. 13.

As shown in Figures 2, 3 and 4 the ends 1 and 2 of the ring R are initially separated by a gap 5 which is illustrated with exaggeration, but in the ½" to 1" size rings may ordinarily amount to about .005" to .015". In the event the tube T is somewhat oversized or the ring R is somewhat undersized the gap 5 may be enlarged as up to about .030" to .040" when the ring R is first assembled upon the end of the tube, as in Fig. 2. One of the advantages of my invention is that the gap 5, measured when the ring first has intimate contact with the tube, may initially be about six times as great as the ultimate inward deflection of the leading edge of the ring, or the depth of cut which the cutting edge 4 of a cutting ring cuts into the outside surface of the tube, without causing the ring to fail in its function of sealing the joint and gripping the tube. This flexibility of size and tolerance comes about in the practice of my invention because as the leading edge 3 of the ring R is constricted and reduced in diameter, see Figs. 1 and 6 to 13, when the leading end of the ring is forced into the conical mouth C of the body of the coupling, then the leading end, and cutting edge if any, of the ring is reduced in circumference, and the axially adjacent part of the gap 5 is reduced 2π times the reduction of the radius of the constricted part of the ring. For example, if the cutting edge 4 of the ring enters the outside surface of the tube to a depth of .010", then the concomitant reduction in the circumference of the cutting, or similarly disposed, edge, will substantially equal 2π times .010", i. e., .062+". If, therefore, the points 12 and 13 at the intersections of the edges 4, 10 and 11 respectively were .062" apart when the edge 4 first began to enter the surface of the tube T, the points 12 and 13 would, at least theoretically, contact when the cut or inward movement of the edge 4 reached .010". As will more fully appear below the end faces 1 and 2 will tend to meet progressively, probably first contacting at the points 12 and 13 and thereafter having an increasing area of contact spreading upwardly and rearwardly from the points 12 and 13. Since the initial area of contact may well be no greater than a theoretical point, the unit pressure will be very high and will tend to substantially "weld" the small contacting areas together. Since bending of the leading end of the ring is progressive with the end face 3 preceding axially adjacent parts in radially inward movement, the extreme leading end (leftward as viewed in Fig. 8 for example) will tend to have initial contact along a line radially outward of the points 12 and 13, again beginning on very small areas at high "welding" pressures whereby to guarantee an initially small but radially complete seal extending from the tube to the flared mouth C of the body. Further constriction of the leading end of the ring may be continued to enhance the grip upon the tube and to develop a greater area of sealing contact developed between the ends of the ring without diminishing the first effective seal between the ends or otherwise impairing the joint. Consideration of commercial departures from theoretical perfection in the character and position of the surfaces of the ends 1 and 2, suggests that the gap 5 be operated at reasonably less than its theoretical maximum. Thus in the ordinary and preferred practice of my invention the ends 1 and 2 of the split ring R are spaced from about .003" to .030" when intimate contact is first established between the ring and the tube for about ½" to 1" size tubes so that the maximum movement of the ends of the ring will not be necessary to effect the desired seal therebetween. I also recognize that the ends 1 and 2 even though preferably cut or ground off square while the ring is in the flat strip form may not be exactly parallel upon initial contact in ring form and may vary in degree in this respect in different size rings of different thickness to modify the shape of the progressively changing area of initial and following contact between the ends, and for this reason also I prefer to use something less than the theoretical maximum for the size of the gap 5. I also prefer that the inner axially extending edges 10 and 11 of the ends 1 and 2 be formed or sheared sharp whereby to have potential cutting edges so that as the ring is advanced and constricted about the tube the edges 10 and 11 especially adjacent the main cutting edge 4 of the ring, i. e., adjacent the corners 12 and 13, see Figure 4, be sharp enough to cut or find their way along more or less helical converging lines on and below the surface of the tube T, see Figure 8.

Referring to Figure 5 the ring R is shown in its constricted position as found in Figure 1. Here it will be seen that the forward edge of the ring has been constricted down to a reduced diameter as shown in Figure 1 and that the gap 5 has been closed as at 20 rearwardly for a measurable distance to about the point 21 back from the ridge G. The end faces 1 and 2 of the ends of the ring have been bent as at 22 transversely of the planes of their surfaces as well as radially inwardly with the constriction of the leading end of the ring. As also shown in Figure 1 it will be seen that the exterior forward outer surface of the ring R has been given tight intimate contact with the conical surface C of the body member B of the coupling between about the points 23 and 24; the line of the point 23 being well forward and within the closed portion 20 of the gap 5, and the point 21 being substantially within the rearward line of contact 24 between the flared mouth C and the ring.

Reverting back to Figure 2 and also to Figures 6 to 11, there is shown in more detail how the ring is closed upon the tube and how the gap 5 is closed, beginning adjacent the edge or end 3 when the ring is advanced and constricted. When the ring is first placed upon the tube as by normal insertion of the tube therein, the ring may well yield during assembly, opening the gap 5 as shown in Figs. 2 and 6. As the nut N engages the rearward end of the ring, see Fig. 1, and forces the ring into the mouth C, the first effect is to contract substantially the axial as well as peripheral length of the ring into intimate contact with the outside surface of the tube advancing the parts of the ring both axially and radially from the solid line positions shown in Figs. 6 and 7 to the dotted line positions. This action is brought about by proportioning the ring to yield circumferentially before bending substantially within its axial cross-section adjacent its leading end or adjacent the leading edge that is to be constricted to a smaller diameter than the initial outside diameter of the tube. When the ring takes substantially rectangular cross sectional form as shown in Figs. 1 to 4, or has a substantially rectangular cross-sectional area for about that part of its axial length that is to be constricted it is preferable that it be no thicker in this section than the thickness of the wall of the tube T, i. e., not more than about .032" for ½" modern commercial copper tube, and be substantially thicker than the ultimate deflection of its cutting or leading edge, and be thick enough in respect to its axial length to refrain from buckling or failing under column stresses induced through the nut N. The latter considerations suggest that the ring be no thinner than about .020" and about ¼" to ⅛" in axial length in the size appropriate for use with ½" O. D. tube. It is preferable that the outer corner 16 of the leading end of the ring be rounded a little as shown to facilitate smooth sliding contact with the mouth C, but I prefer to maintain a substantially uniform wall thickness throughout that part of the leading end of the ring that is constricted and deflected inwardly whereby to enhance a progressive deflecting action and progressive sealing contact between the ends of the ring. Thus the leading end of the ring is as a whole preferably blunt ended and rectangular rather than tapering or wedge shaped and is of and within itself stiff enough to induce the effect shown in Figs. 6 and 7 as described above. The addition of a lip forwardly of the edge 3 of my ring as taught in certain of the Ermeto patents would not detract from the utility of my invention or its desired mode of operation since the lip is adapted to perform its function preliminarily of and in addition to the function and operation of the other parts of the ring. Preferably the outer rearward corner 17 of the ring is formed the same as the former corner 16 whereby to make the ring reversible in the first instance. While I prefer that the nut N exert pressure essentially axial thereof on the trailing end of the ring, it is practicable to make the angle of contact between the nut and ring inclined whereby to direct a radial component from the nut to the ring to constrict the trailing end of the ring more or less as may be desired.

When the ends 1 and 2 are advanced to the positions 1a and 2a, as shown in Figs. 6 and 7, the end 3 to 3a, edge 10 to 10a, and the points 12 and 13 to 12a and 13a respectively radial pressure is exerted essentially from the mouth C through the forward outer corner of the ring, assuming the nut N has essentially axial contact with the trailing end of the ring as shown and exerts essentially axial pressure thereupon as is practicable in the practice of my invention. Thus the radial pressure between the ring and the tube while perhaps higher at the forward end of the ring than at the trailing end may well be high throughout so long as the gap 5 remains open as at 5a, as between about .003" and .030", when the ring has acquired intimate tight contact with the tube. This facility of gripping the tube throughout the whole length of the ring has a desirable resistance to deleterious effects of vibration, and where the radial pressure is largely applied at the leading end as shown, the tendency of unit pressures to decrease somewhat from the leading to the trailing end of the ring adds a desirable vibration dampening factor to the other advantages of my invention.

Further advancement of the ring R into the flared mouth C begins the inward deflection of the leading end of the ring and the circumferential constriction thereof as shown in Figs. 8 and 9. The position of the parts shown in dotted lines in Figs. 6 and 7 is shown in full lines in Figures 8 and 9. Here while the end 3 advances to 3b, the points 12 and 13 make initial sealing contact at 12b and 13b and the forward end of the gap becomes closed as at 14. The other parts of the ends 1 and 2 may remain spaced as in Figure 6 while the ring continues to grip the tube throughout its axial and circumferential length. As shown in Fig. 9 the cutting edge 4 has entered the outer surface of the tube T and the ridge G has begun to rise as at G1. Between the inwardly turning forward ends of the ring ends 1 and 2 the surface of the tube T will stand at least at its full height as at 15 as influenced more or less by the edges 10 and 11 approaching each other circumferentially while moving axially. In all events so much of the area 15 as stands higher than the radially inwardly deflected parts of the edges 10 and 11 serves to anchor the ring against rotation with the nut while the ring is moved axially. The tendency of the edges 10 and 11 to cut the tube circumferentially will be influenced by the pitch of the conical mouth C, which I prefer to have at about 12° to the axis of the body, the friction between the parts and perhaps more detailed factors than I have hereinabove discussed. If the edges 10 and 11 raise any flash that gets between the abutting surfaces of the ends 1 and 2 inch flash will be merged in the sealing area and being of softer material than the ends of the ring will of itself have a bonding and sealing effect therein.

In Figures 10 and 11 the parts as shown in a final sealing and locking position correspond to Figures 1 and 5. The ends 1 and 2 have achieved intimate sealing contact throughout a substantial axial and radial distance as at 20, effecting a weld-like seal throughout the shaded area 25, see Fig. 11, back at least to the point 21, whilst the gap 5 may and preferably does persist throughout the remaining axial length of the end faces 1 and 2. As shown in Fig. 11 the cutting edge 4 has penetrated to its desired maximum depth, from about .006" to .013" in a ½" tube of about .032" wall thickness, and the ridge G has been turned up to its desired "appreciable" size, proportionately about as shown. Although as shown the area 25 may be small relative to the whole of the areas of the end faces 1 and 2, it is large enough to effectively seal the joint, extending as it does radially between the tube and the camming surface C.

While I prefer that the circumferential length of the ring be a little less than the outer circumference of the tube whereby to facilitate intimate contact between the ring and the tube throughout the axial length thereof, still if through the combinations and permutations of manufacture and tolerances a ring having a greater circumferential length than the outside circumference of its coacting tube should be paired together, whereby to tend to close the whole length of the gap 5 before constricting the leading end of the ring, a useful joint would still result. In such a joint the sealing of the leading parts of the ends of the ring would take place in much the same way as above described with the highest sealing pressures being developed progressively, beginning at the leading end of the ring even though the area corresponding to the area 25 of Figure 11 might tend to be larger in the completed coupling. While such a joint might lack something of the vibration resistant qualities of the joints in which the gap 5 is not tightly closed throughout its axial length, it would tend to be no worse than the prior art joints employing integral annular rings in the first instance, and would retain other advantages of the instant invention.

In Figure 12 the tube T has a pre-cut annular groove 30 into which the leading end 31 of the ring 32 is constricted through the reaction of the flared mouth C in substantially the same way that the ring R is constricted as above described. The ring 32 may be the same or substantially the same as the ring R excepting that the inner forward edge 33 need not be a cutting edge per se since no cutting function is required of it. The parts are shown in a median condition in Figure 12, the ring 32 being partially advanced to its final sealing and gripping position. Preferably the circumferential length of the ring will be such in relation to the outer circumference of the tube that the ends of the ring will have abutted and come into sealing contact with each other in the area 34 as shaded in the drawings. In its final position the forward end of the ring will have fully entered the groove 30 having advanced leftwardly from the position shown in Figure 12. In this form of my invention I prefer that the tube T abut the shoulder 35 to hold the tube against leftward movement according to the practice of the Ermeto inventions in which cutting rings are employed when the leading end of the ring engages and/or effects sealing contact with the radial face of the groove 30.

In Figure 13 there is illustrated the operation of my invention adapted to the type of joint more particularly described in the above mentioned Kreidel Patent No. 1,904,866. Here the tube T is indented as at 40 rather than cut under the action of the split sealing ring 41 as it enters the conical mouth C1 of the coupling body as taught in that patent. The ring 41 may substantially correspond to the ring R in respect to it being split and having substantially the same operation in respect to the sealing of the adjacent ends thereof when the leading edge 42 of the ring is deflected inwardly whereby to bring about an area of sealing contact 43 shown in shading corresponding to the sealing area 25 between the end face of the ends of the ring. Following the practice of the above mentioned patent the tube T is permitted to move axially leftward as viewed in Figure 13, and the ring 41 needs no cutting edge per se, it being intended that the ring form an annular indentation in the tube rather than a cut-out groove and ridge as heretofore described. In this embodiment and application of my invention I contemplate that the depth of the indented groove 40 be of the same order as the depth of the penetration of the cutting edge 4 of the ring R, see Fig. 11, whereby the circumferential movement of the split ends of the ring 41 will bring about the progressive sealing of the ends thereof in substantially the same way that the abutting areas of the ends of the ring R are sealed or welded together. Similarly I prefer that the circumferential length of the ring be a little less than the circumferential length of the outside surface of the tube T whereby to effect the desirable vibration resistant grip of the tube by the ring throughout substantially the axial length of the ring.

In Figure 14 the parts are intended to be shown in the sealed relation as in Figure 5. The tube T here is gripped by a ring 50 which may differ only from the ring R by the addition thereto at the trailing end thereof of a stiffening or reenforcing flange 51 which tends to resist circumferential contraction more actively than the corresponding end of the ring R. Thus when the ring 50 has gripped the tube and has its split ends in mutual sealing contact as at 52 the remaining gap 53 between the split ends of the ring will tend to taper from adjacent the forward area of contact at about the point 54 rearwardly to its widest extent between the spaced ends of the flange 51. In this way it is practicable to cause the ring to have intimate contact with the outer surface of the tube throughout only part of the axial length of the ring as to about the point 55 and then have less contact and/or a spaced relation with the outside surface of the tube under and adjacent the flange 51 for the purpose of effecting a vibration dampening grip of varying intensity between the ring and the tube. The ring 50 may otherwise correspond to either the rings 32 or 41 as well as the ring R for the several purposes and effects thereof, adding to those effects the function of the flange 51 for the purpose above described.

The principles and advantages of my invention are not necessarily confined to or realized from integral one piece ring of one material. My invention may be employed in rings containing more than one material as in my copending application Serial No. 556,007, as well as in rings embracing more than one piece or part as in U. S. Patent No. 2,139,413. For example the insert packing ring k, Figs. 4 and 5 of said patent, may well be improved to embrace the instant invention and have its advantageous mode of operation in coaction with the other elements of said patent. Other variants and adaptations of my invention will preserve at least many of its beneficient characteristics so long as the ring or the axial part of the ring that is deeply constricted into the surface of the tube is made and used within the teachings hereof and has its spaced ends brought progressively into sealing or welding engagement whilst an annular grip of the tube and seal between the coupling body and the tube is carried out.

While I have illustrated and described preferred and modified embodiments of my invention further modifications, improvements and changes will appear to those skilled in the art within the precepts and examples thereof, and I do not care to be limited to the presently disclosed forms and embodiments or in any manner other than by the claims appended hereto.

I claim:

1. In a tube coupling having a body member with a flared mouth adapted to receive the tube to be coupled and receive a sealing ring and constrict the same upon the tube when the ring is forced into said flared mouth, the tube when coupled having an annular groove into which the leading end of said ring is constricted, and having means coacting with said member and said ring to force the ring into the said flared mouth of said member, the improvement that said ring prior to being constricted comprises a split substantially cylindrical annulus having an axial gap, the circumferential length of said ring exclusive of said gap being less than the initial outer circumference of the tube to be coupled but not less than the least circumferential length of the bottom of said groove, and said ring after being constricted having its leading end turned radially inwardly into said groove with the edges of the gap in close sealing contact at the leading end but spreading apart toward the other end thereof, whereby the leading end is in close sealing engagement and the ring in clamping contact with the tube.

2. The improvement of claim 1 in which the said leading end of said ring has a cutting edge engageable with the tube and harder than the tube and which upon advancement of said ring into said body cuts the said groove in the surface of the tube into which the leading end and edge of said ring is constricted.

3. The improvement of claim 1 in which at least the leading end of said ring is not substantially thinner than about ½ the thickness of the wall of the said tube and the depth of said groove is from about 1/6 to ⅓ the thickness of the wall of said tube.

4. The improvement of claim 1 in which the gap at the leading end of said ring is closed prior to completing the constriction of the ring into the groove in the pipe.

PAUL D. WURZBURGER.

REFERENCES CITED

The following references are of record in the file of this patent:

UNITED STATES PATENTS

| Number | Name | Date |
|---|---|---|
| 1,046,138 | Babbitt et al. | Oct. 3, 1912 |
| 1,124,359 | Taylor | Jan. 12, 1915 |
| 1,327,106 | Leahy | Jan. 6, 1920 |
| 1,888,343 | Bohlman et al. | Nov. 22, 1932 |
| 1,904,866 | Kreidel | Apr. 18, 1933 |
| 2,064,140 | Appleton | Dec. 15, 1936 |
| 2,179,127 | Lauer | Nov. 7, 1939 |
| 2,230,116 | Kreidel | Jan. 28, 1941 |
| 2,344,032 | Eden | Mar. 14, 1944 |

FOREIGN PATENTS

| Number | Country | Date |
|---|---|---|
| 444,002 | Great Britain | Mar. 10, 1936 |